(12) United States Patent
Hsu

(10) Patent No.: US 7,502,243 B2
(45) Date of Patent: Mar. 10, 2009

(54) DC/AC INVERTER WITH ADJUSTABLE GATE-SOURCE VOLTAGE

(75) Inventor: Albert Hsu, Taipei (TW)

(73) Assignee: O2Micro International Ltd., Georgetown (KY)

( * ) Notice: Subject to any disclaimer, the term of this patent is extended or adjusted under 35 U.S.C. 154(b) by 121 days.

(21) Appl. No.: 11/453,750

(22) Filed: Jun. 15, 2006

(65) Prior Publication Data

US 2007/0291521 A1 Dec. 20, 2007

(51) Int. Cl.
*H02M 7/5387* (2007.01)
*H02M 3/335* (2006.01)
*H02M 3/24* (2006.01)

(52) U.S. Cl. .............................. 363/132; 363/17; 363/98

(58) Field of Classification Search ................ 363/131, 363/132, 19, 21.06, 17, 98
See application file for complete search history.

(56) References Cited

U.S. PATENT DOCUMENTS 5,932,974 A * 8/1999 Wood ......................... 315/119
6,812,916 B2 * 11/2004 Hwang ........................ 345/102

* cited by examiner

*Primary Examiner*—Jessica Han
*Assistant Examiner*—Emily Pham
(74) *Attorney, Agent, or Firm*—Wang Law Firm, Inc.; Li K. Wang

(57) ABSTRACT

The present invention is a DC/AC inverter for converting a DC supply voltage signal to an AC voltage signal. The DC/AC inverter includes a drive circuit, a switch circuit, a transformer circuit and an auxiliary circuit. The drive circuit provides a first drive signal and a second drive signal. The switch circuit includes a high-side transistor for receiving the first drive signal from the drive circuit and a low-side transistor for receiving the second drive signal from the drive circuit. The switch circuit further receives the DC supply voltage signal and generates a voltage signal. The transformer circuit receives the voltage signal from the switch circuit and transforms it to the AC voltage signal. The auxiliary circuit adjusts a gate-source voltage of the high-side transistor and thus enables the DC/AC inverter to be applicable to a wide DC voltage supply range.

21 Claims, 8 Drawing Sheets

DC/AC INVERTER WITH ADJUSTABLE GATE-SOURCE VOLTAGE

FIELD OF THE INVENTION

The present invention relates to a DC/AC inverter, and more particularly to a DC/AC inverter utilizing N-channel metal oxide semiconductor field effect transistors (N-MOSFETs).

BACKGROUND OF THE INVENTION

Currently, liquid crystal displays (LCDs) are becoming a popular display technology for televisions and monitors. LCD panels are made from electronically controlled light valves that require a backlight source in order to produce a visible image. LCD TVs and LCD monitors typically use cold-cathode fluorescent lamps (CCFLs) for this purpose. However, CCFLs have some unique characteristics that must be accounted for when being driven and controlled. For example, CCFLs typically require a DC/AC inverter that transforms a DC voltage signal to an AC voltage signal with an waveform of approximately from 40 KHz to 80 KHz and with an effective voltage of approximately from 500V to 1000V.

The AC waveform needed to drive the CCFLs can be created via the DC/AC inverter which may have several topologies including Royer, full-bridge, half-bridge and push-pull. Both half-bridge and full-bridge topologies require a high-side MOSFET. A drive circuit is essential for such a high-side MOSFET.

FIG. 1 illustrates a prior art DC/AC half-bridge inverter 100. The inverter 100 receives a DC supply voltage VIN and converts it to an AC voltage VOUT. The inverter 100 includes a high-side MOSFET 111 and a low-side MOSFET 113, where the high-side MOSFET 111 is a P-channel MOSFET (P-MOSFET) and the low-side MOSFET 113 is an N-MOSFET. The pair of MOSFETs 111 and 113 are alternatively turned on and off under control of a controller 115. Whereas the low-side MOSFET 113 can be directly driven by the controller 115, a control signal CTLL provided by the controller 115 must be shifted to a higher level through a MOSFET 101, a first resistor 103, a second resistor 105, a first transistor 107 and a second transistor 109 to drive the high-side MOSFET 111. P-MOSFETs have some drawbacks compared with N-MOSFETs. One concern is that P-MOSFETs are less efficient because of their inherent higher on-resistance. Another concern is that P-MOSFETs are more expensive than N-MOSFETs.

FIG. 2 illustrates another prior art half-bridge inverter 200. Repetitive description of similar components contained in FIG. 1 is omitted herein for clarity. In the inverter 200, a high-side MOSFET 201 adopts an N-MOSFET instead of a P-MOSFET to overcome the aforementioned drawbacks. To ensure the high-side MOSFET 201 operates properly, a diode 203 and a capacitor 205 are included as shown in FIG. 2. However, the inverter 200 has a limit on values of the DC supply voltage VIN, which can be observed from the following analysis. Firstly, if a forward voltage of the diode 203 is negligible, a voltage VBC across the capacitor 205 is equivalent to the DC supply voltage VIN. Secondly, it should be appreciated by the skilled in the art that an operating gate-source voltage of the high-side MOSFET 201 is approximately equal to the voltage VBC. Consequently, the gate-source voltage is approximately equal to the DC supply voltage VIN in this instance. Given that most of MOSFETs define gate-source voltages not to exceed 20V and overcharging MOSFETs can lead to "shoot-through" where both the high-side and low-side MOSFETs switch on, in the inverter 200, there is a limit on values of the DC supply voltage VIN to prevent occurrence of "shoot-through".

Thus, it is desirous to have an inverter which adopts N-MOSFETs and at the same time operates in a wide DC supply range. It is to such an inverter that the present invention is primarily directed to.

SUMMARY OF THE INVENTION

In one embodiment, there is provided an inverter for converting a DC voltage signal to an AC voltage signal. The inverter includes: 1) a drive circuit providing a first drive signal and a second drive signal, the drive circuit having an input terminal for receiving an operating voltage signal; 2) a switch circuit generating a voltage signal at an output terminal, the switch circuit including a high-side transistor for receiving the first drive signal from the drive circuit and a low-side transistor for receiving the second drive signal from the drive circuit, the high-side transistor and the low-side transistor being coupled in series between the DC voltage signal and ground, the high-side transistor having a gate-source voltage; 3) an auxiliary circuit adjusting the gate-source voltage of the high-side transistor, the auxiliary circuit being coupled to the drive circuit for providing the operating voltage and to the output terminal of the switch circuit for receiving the voltage signal; and 4) a transformer circuit coupled to the switch circuit at the output terminal and being capable of transforming the voltage signal into the AC voltage signal, wherein the transformer circuit having a primary winding, a secondary winding, and a capacitance circuit, the primary winding having a first end and a second end, the primary winding further having a first number of turns, the secondary winding outputting the AC voltage signal.

In another embodiment, there is provided an inverter for converting a DC voltage signal to an AC voltage signal. The inverter includes: a) a full-bridge circuit receiving the DC voltage signal, the full-bridge circuit having two bridge legs, each bridge leg further including 1) a drive circuit providing a first drive signal and a second drive signal, the drive circuit having an input terminal for receiving an operating voltage signal, 2) a switch circuit generating a voltage signal at an output terminal, the switch circuit including a high-side transistor for receiving the first drive signal from the drive circuit and a low-side transistor for receiving the second drive signal from the drive circuit, the high-side transistor and the low-side transistor being coupled in series between the DC voltage signal and ground, the high-side transistor having a gate-source voltage, and 3) an auxiliary circuit adjusting the gate-source voltage of the high-side transistor, the auxiliary circuit being coupled to the drive circuit for providing the operating voltage and to the output terminal of the switch circuit for receiving the voltage signal; and b) a transformer circuit generating the AC voltage signal, the transformer circuit having a primary winding and a secondary winding, the primary winding having two ends, each of the two ends being coupled to one of the two bridge legs of the full-bridge circuit, the primary winding further having a first number of turns, the secondary winding outputting the AC voltage signal.

In yet another embodiment, there is provided a LCD device for displaying video images. The LCD device includes a power module for receiving external electrical power and providing DC voltage to the LCD device, an input interface for receiving video signals, a LCD panel coupled to the input interface for receiving the video signals and displaying the video images, a light source for providing backlight to the LCD panel, and an inverter for converting the DC voltage from the power module to an AC voltage and providing the AC voltage to the light source, the inverter further having a gate-source voltage and the gate-source voltage being adjusted according to the DC voltage.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION OF THE INVENTION

Reference will now be made in detail to embodiments of the present invention. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Figure 3:
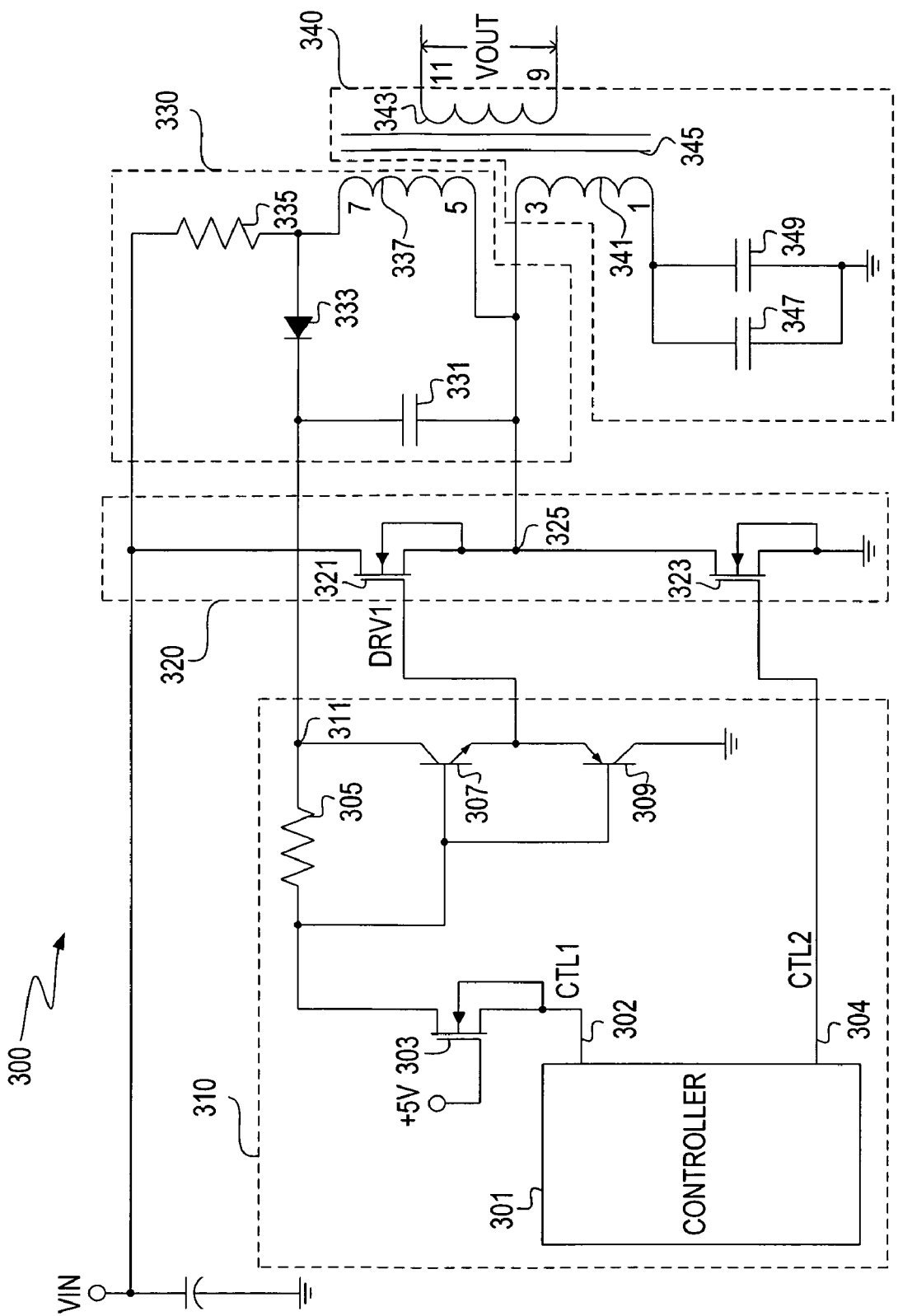
FIG. 3 is a half-bridge inverter in accordance with one embodiment of the present invention.

FIG. 3 illustrates a half-bridge inverter 300 in accordance with the present invention. The inverter 300 converts a DC supply voltage VIN to an AC voltage VOUT and the inverter 300 is composed of a drive circuit 310, a switch circuit 320, an auxiliary circuit 330 and a transformer circuit 340. The drive circuit 310 provides drive signals for the switch circuit 320, which operates in a certain switching state in response to the drive signals. In the switch circuit 320, the DC supply voltage VIN is converted to an intermediate voltage which is delivered to the transformer circuit 340 at an output terminal 325. The transformer circuit 340 then transforms the intermediate voltage to the AC voltage VOUT. The auxiliary circuit 330 is used to ensure that the switch circuit 320 works in an optimum condition with various DC supply voltages.

The switch circuit 320 includes a high-side N-MOSFET 321 and a low-side N-MOSFET 323 which are coupled in series between the DC supply voltage VIN and the ground. The juncture of the two MOSFETs forms the output terminal 325. To realize conversion of the DC supply voltage to the intermediate voltage, the pair of MOSFETs are alternatively switched on and off under control of the drive circuit 310.

The drive circuit 310 includes a controller 301, a drive MOSFET 303, a resistor 305, and a pair of transistors 307 and 309. The controller 301 outputs control signals CTL1 and CTL2. Whereas the control signal CTL2 can drive the low-side N-MOSFET 321 directly through line 304, the voltage level of the control signal CTL1 on line 302 is not high enough to drive the high-side N-MOSFET 321. So the control signal CTL1 is processed through the drive MOSFET 303, the resistor 305 and the pair of transistors 307 and 309 before driving the high-side N-MOSFET 321. The drive MOSFET 303 and the resistor 305 form a level shift circuit for converting the voltage of the control signal CTL1 to a higher level. The transistors 307 and 309 is coupled in so called totem-pole arrangement respectively for shortening rising and falling time of the control signal CTL1 and consequently turning on and off the high-side N-MOSFET 321 much faster. Finally, through the level shift circuit and the pair of transistors 307 and 309, the control signal CTL1 is converted to a drive signal DRV1 which has a voltage high enough to drive the high-side N-MOSFET 321 and has a faster rising and falling time to effectively reducing switching loss on the high-side N-MOSFET 321. In addition, an operating voltage of the level shift circuit and the pair of transistors 307 and 309 is provided through an input terminal 311.

The transformer circuit 340 includes a transformer and a capacitance circuit. The transformer has a primary winding 341, a secondary winding 343 and an iron core 345. A terminal 1 of the primary winding 341 is tied to the ground through the capacitance circuit formed by capacitors 347 and 349 coupled in parallel. A terminal 3 of the primary winding is connected to the output terminal 325 for receiving the intermediate voltage. The AC voltage VOUT is defined as a voltage between terminals 9 and 11 of the secondary winding 343.

The auxiliary circuit 330 includes a capacitor 331, a diode 333, a resistor 335 and an auxiliary winding 337. The capacitor 331 is connected between the input terminal 311 and the output terminal 325. A cathode of the diode 333 is coupled to the input terminal 311, an anode of the diode 333 is coupled to one end of the resistor 335, and the other end of the resistor 335 is coupled to the DC supply voltage VIN. The auxiliary winding 337 is coupled between the anode of the diode 333 and the output terminal 325. With the auxiliary circuit 330, a gate-source voltage of the high-side N-MOSFET 321 will be adjustable, which can prevent "shoot-through" occurring on the pair of MOSFETs 321 and 323.

Figure 4:
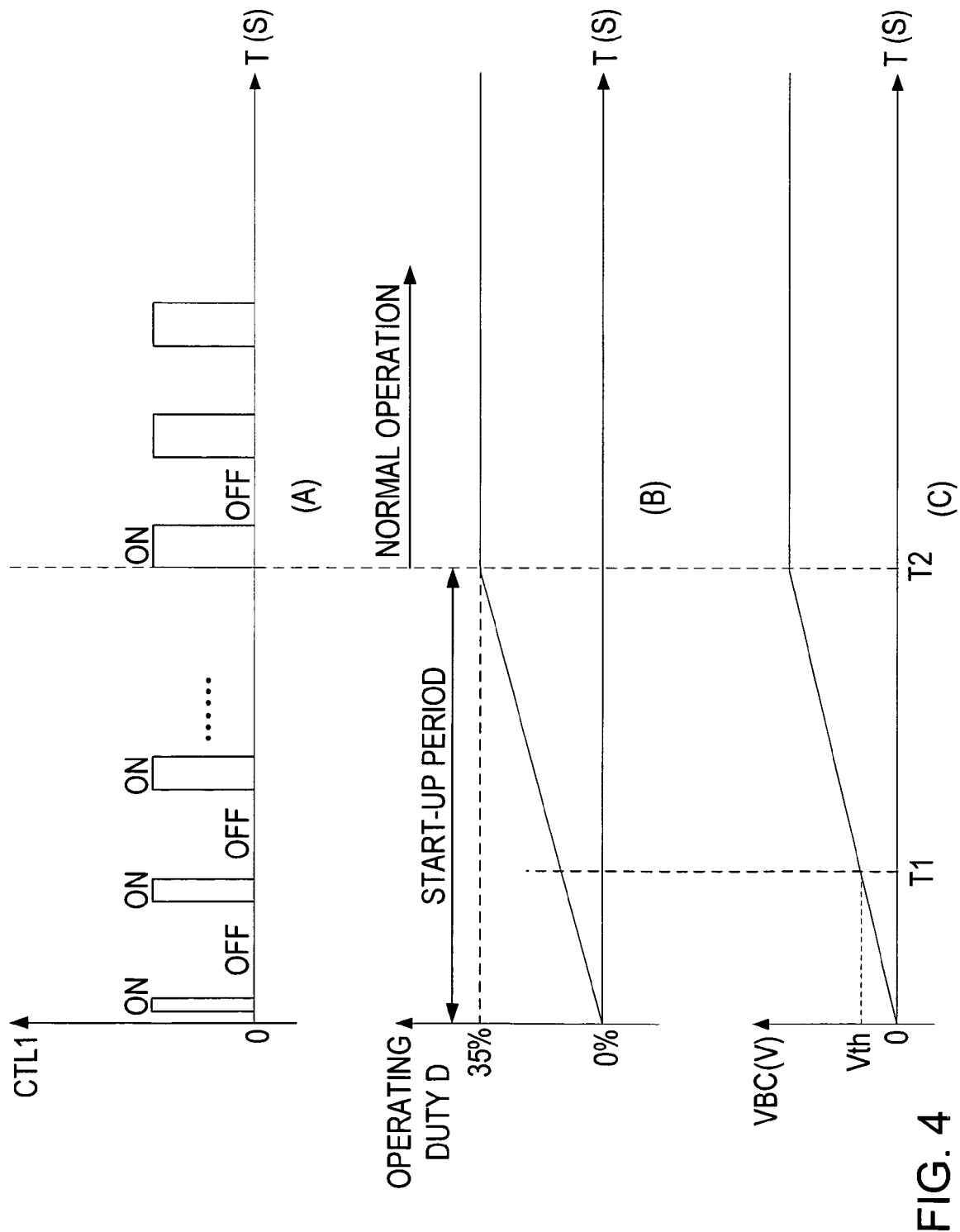
FIG. 4 is a timing diagram of the half-bridge inverter in FIG. 3.

FIG. 4 is a timing diagram illustrating how the control signal CTL1, an operating duty D and a voltage VBC across the capacitor 331 behave with time elapsing. Herein, the operating duty of the high-side N-MOSFET 321 or the low-side N-MOSFET 323 is equivalent to the operating duty of the primary winding 341 and a universal symbol D is designated to represent these two operating duties. The timing diagram consists of plots A, B and C for the control signal CTL1, the operating duty D and the voltage VBC, respectively. The plot A indicates that the ON period of the control signal CTL1 increases gradually from the beginning to T2. Since the cycle of the control signal CTL1 is constant due to a fixed operating frequency, the duty of the control signal CTL1 also increases gradually in response to the increased ON period. But from time T2, the ON period keeps constant and the duty of the control signal CTL1 also becomes constant. Given that the operating duty D is determined by the control signal CTL1, it can be understood that the operating duty D increases gradually in a start-up period from the beginning to time T2 and then becomes constant in normal operation from time T2.

In the plot C, the voltage VBC is similarly affected by the control signal CTL1. In the start-up period, the voltage VBC increases gradually from zero. Because the voltage VBC is inevitably lower than a threshold voltage Vth of the high-side N-MOSFET 321 before time T1, the resistor 335 acts to ensure that the operating voltage can turn on the high-side N-MOSFET 321 successfully. So, the operating voltage which is equal to $$\frac{VIN \times R1}{R1 + R2}$$

must be greater than the threshold voltage Vth, where R1 is a resistance of the resistor 305 and R2 is a resistance of the resistor 335. In addition, the smaller the resistance R2 is, the larger is the reverse peak current that passes through the diode 333 when turning on the high-side N-MOSFET 321. For the inverter 300, the reverse peak current should be as small as possible, and consequently the resistance R2 should be set as large as possible after fulfilling the prerequisite of $$\frac{VIN \times R1}{R1 + R2}$$

greater than the threshold voltage of the high-side N-MOSFET 321.

Once the voltage VBC is greater than the threshold voltage Vth after time T1, the resistor 335 becomes useless. This is because the primary winding 341 and the auxiliary winding 337 serve as an auxiliary voltage source which replaces the DC supply voltage VIN to charge the capacitor 331, since it has the lowest internal impedance compared with the resistor 335. So the charging current for the capacitor 331 is provided by the auxiliary voltage source in normal operation.

When the high-side N-MOSFET 321 is turned on by the control signal CTL1, the voltage at the output terminal 325 is always pushed to VIN, the voltage level of the DC supply voltage. Since a voltage across the capacitors 347 and 349 is steadily tied at VIN/2, half of the DC supply voltage VIN in normal operation, a resulting positive voltage difference VIN/2 is generated between the terminal 3 and the terminal 1. On the contrary, if the low-side N-MOSFET 323 is turned on, a resulting negative voltage difference –VIN/2 is generated between the terminal 3 and the terminal 1. On the other hand, due to induction effect, an induction voltage that is equal to $$\frac{VIN}{2} \times \frac{Na}{Np}$$

is generated across the auxiliary winding 337, where Na is defined as turns of the auxiliary winding 337 and Np as turns of the primary winding 341 between the terminals 1 and 3. As a result, a switching voltage across the capacitor 331 is charged to $$VIN + \frac{VIN}{2} \times \frac{Na}{Np}$$

via a charging-pumping function of the capacitor 331. However, because the capacitor 331 also acts like a filter capacitor, the switching voltage is turned into a function of the operating duty D. To get an average DC voltage level, the voltage VBC is calculated according to an equation $$1) \quad VBC = \left(VIN + \frac{VIN}{2} \times \frac{Na}{Np}\right) \times D$$

Figure 1:
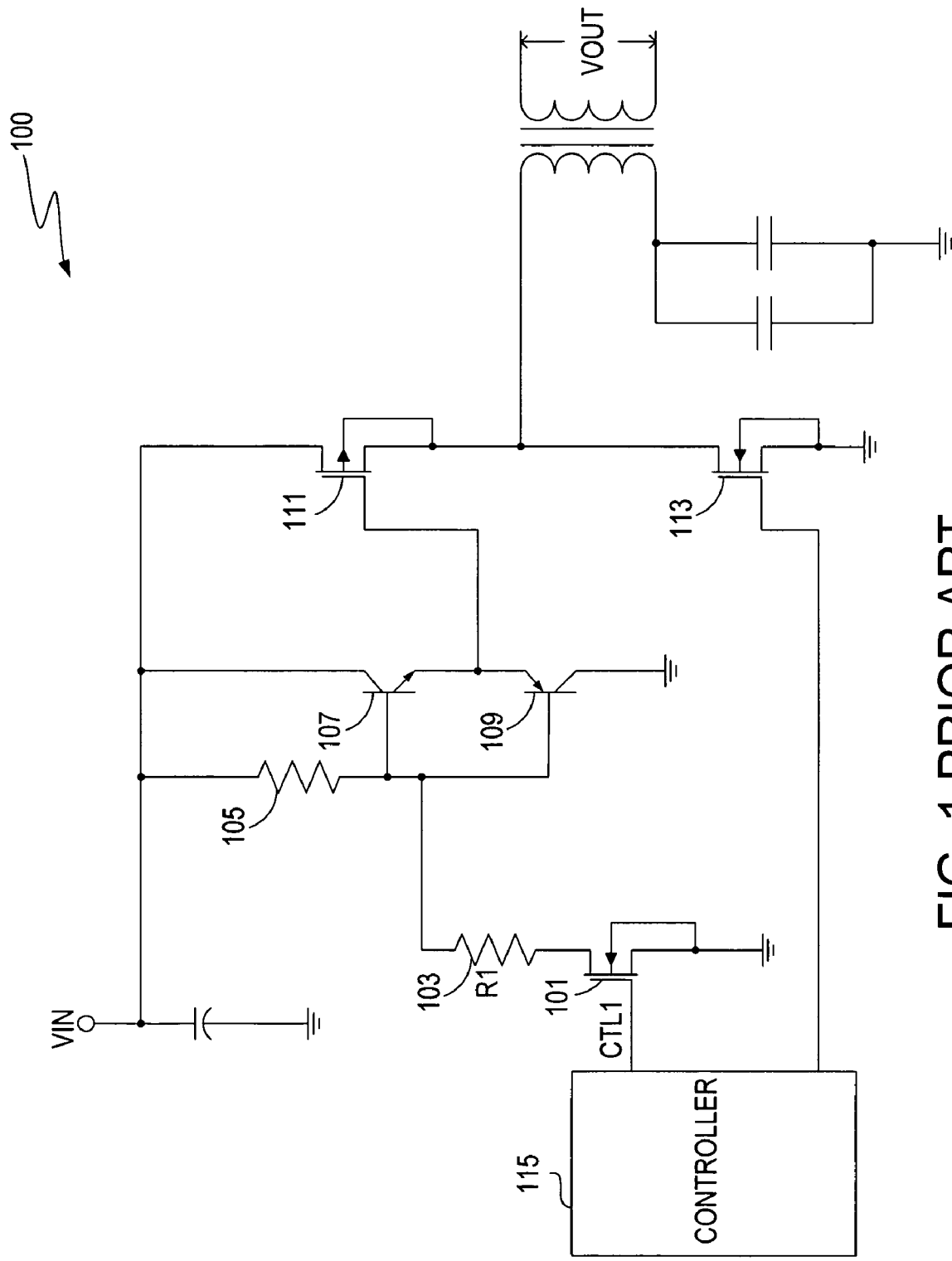
FIG. 1 is a prior art half-bridge inverter.
Figure 2:
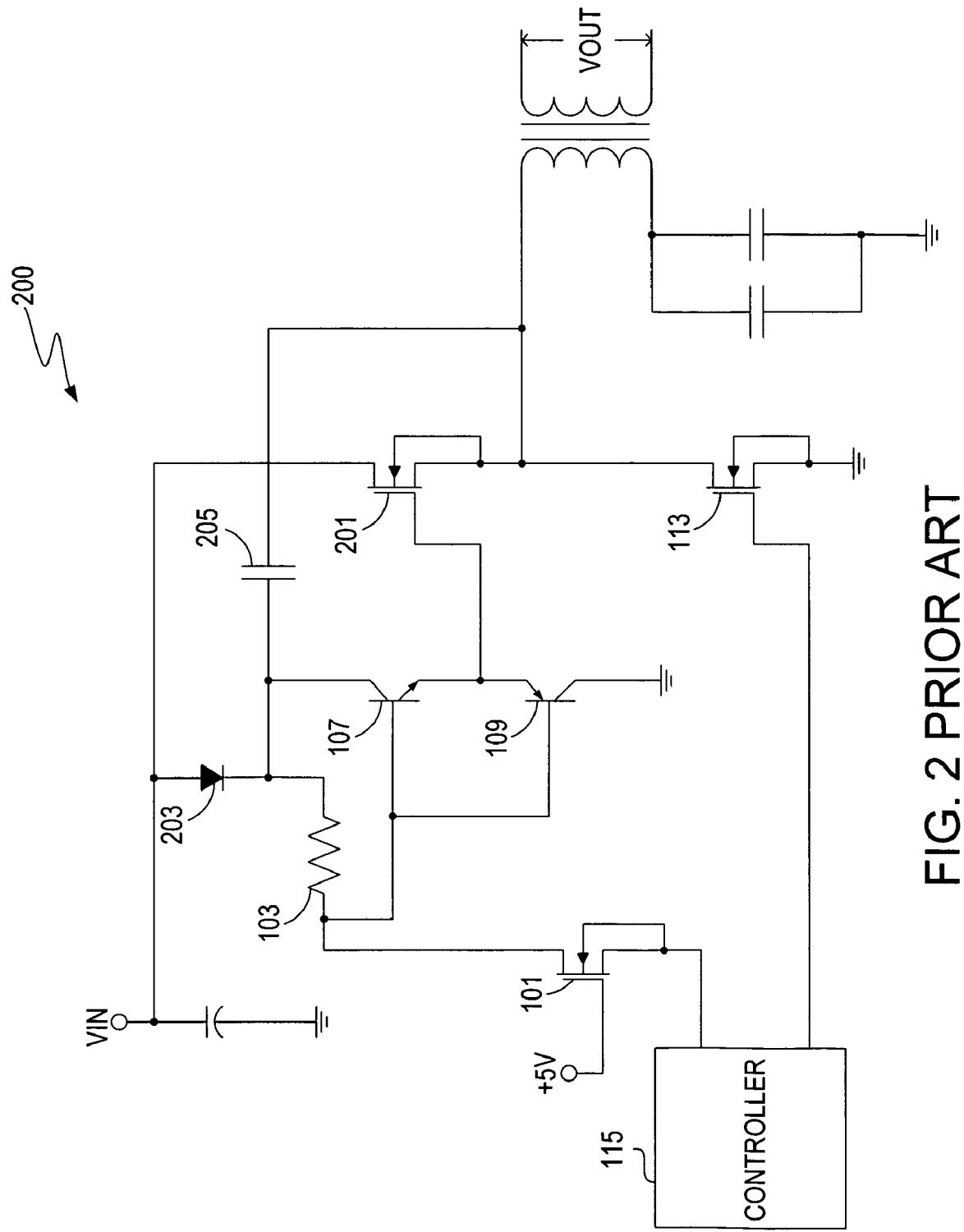
FIG. 2 is another prior art half-bridge inverter.

As stated previously, the gate-source voltage of the high-side N-MOSFET 321 is approximately equal to the voltage VBC, which is herein expressed as $$\left(VIN + \frac{VIN}{2} \times \frac{Na}{Np}\right) \times D,$$

so it is adjustable in this instance. Typically, the operating duty D is set at 35% in normal operation as illustrated in the plot B for a lower distortion rate at the output current of the high-side N-MOSFET 321. Since the DC supply voltage VIN is constant, the voltage VBC can be adjusted by changing the ratio of Na/Np and so can the gate-source voltage of the high-side N-MOSFET 321. For example, for Np set as 17 turns, Na as 11 turns, VIN as 19.8V and the operating duty of 0.34, the voltage VBC will be 8.9V. Considering the voltage drop on the diode 333 and the voltage drop on the transistor 307, the gate-source voltage of the high-side N-MOSFET 321 is about 7.9V which is dramatically reduced compared with the gate-source voltage of the high-side N-MOSFET in FIG. 2 and consequently voltage stress is greatly reduced on the capacitor 331, the MOSFETs 321 and 323, the drive MOSFET 303 and the transistors 307 and 309.

Figure 5:
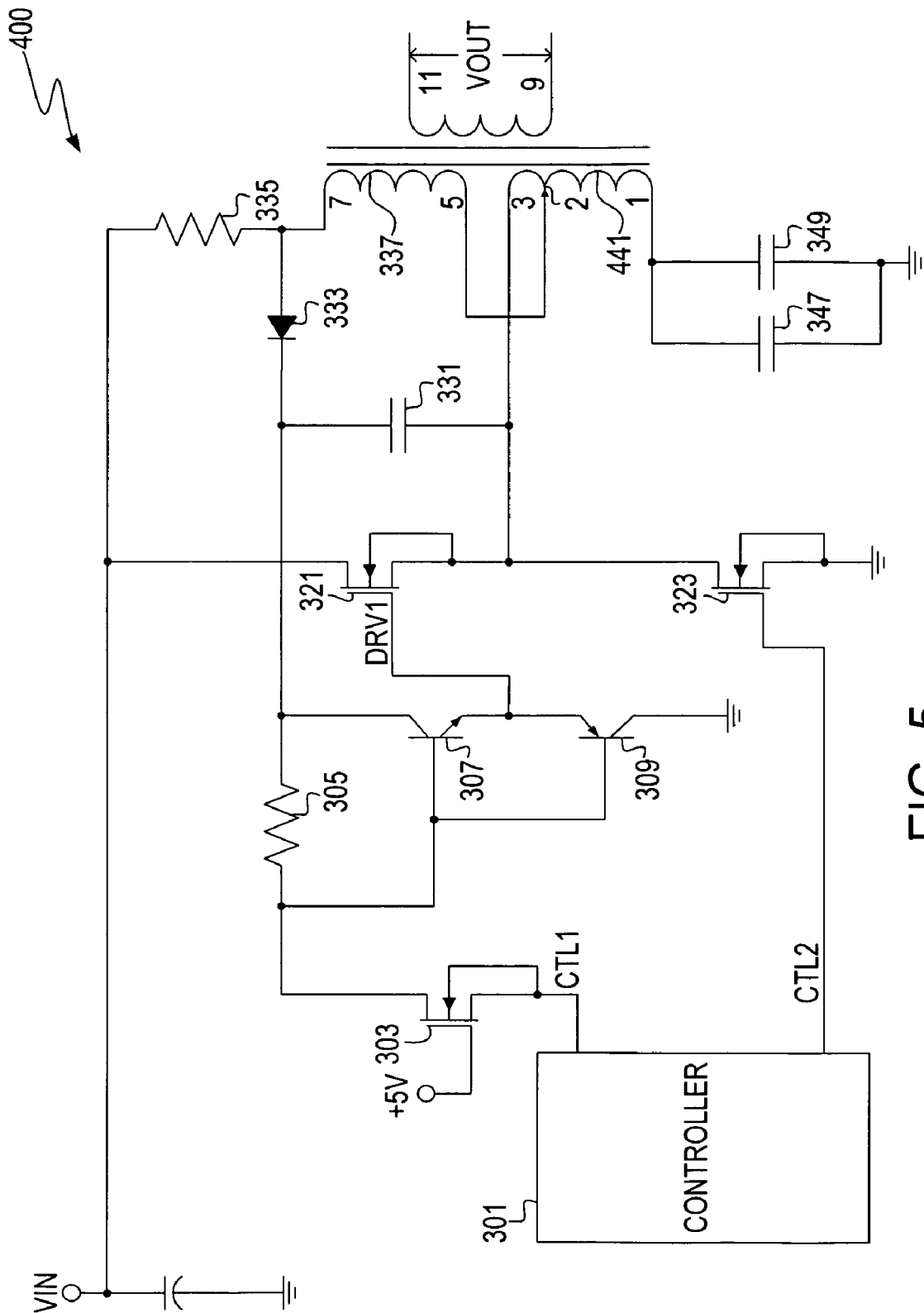
FIG. 5 is another half-bridge inverter in accordance with another embodiment of the present invention.

FIG. 5 illustrates another half-bridge inverter 400 in accordance with the present invention. Repetitive description of similar components shown previously in FIG. 3 is omitted herein for clarity. In the inverter 400, a primary winding 441 with a tab 2 is used and the position of the tab 2 is adjustable. Instead of being coupled to the terminal 3 of the primary winding 441, the terminal 5 of the auxiliary winding 337 is coupled to the tab 2. Consequently, the equation 1) is rewritten as an equation $$2) \quad VBC = \left(\frac{Nl}{Np} \times VIN + \frac{VIN}{2} \times \frac{Na}{Np}\right) \times D$$

where Nl is defined as turns of the primary winding 441 between the tab 2 and the terminal 1. From the equation 2), it should be understood that the voltage VBC can be adjusted by changing the ratio of Na/Np and Nl/Np as well and so can the gate-source voltage of the high-side N-MOSFET 321. Hence, the half-bridge inverter 400 is more effective in applications with a wider VIN supply range than the inverter 300.

Figure 6:
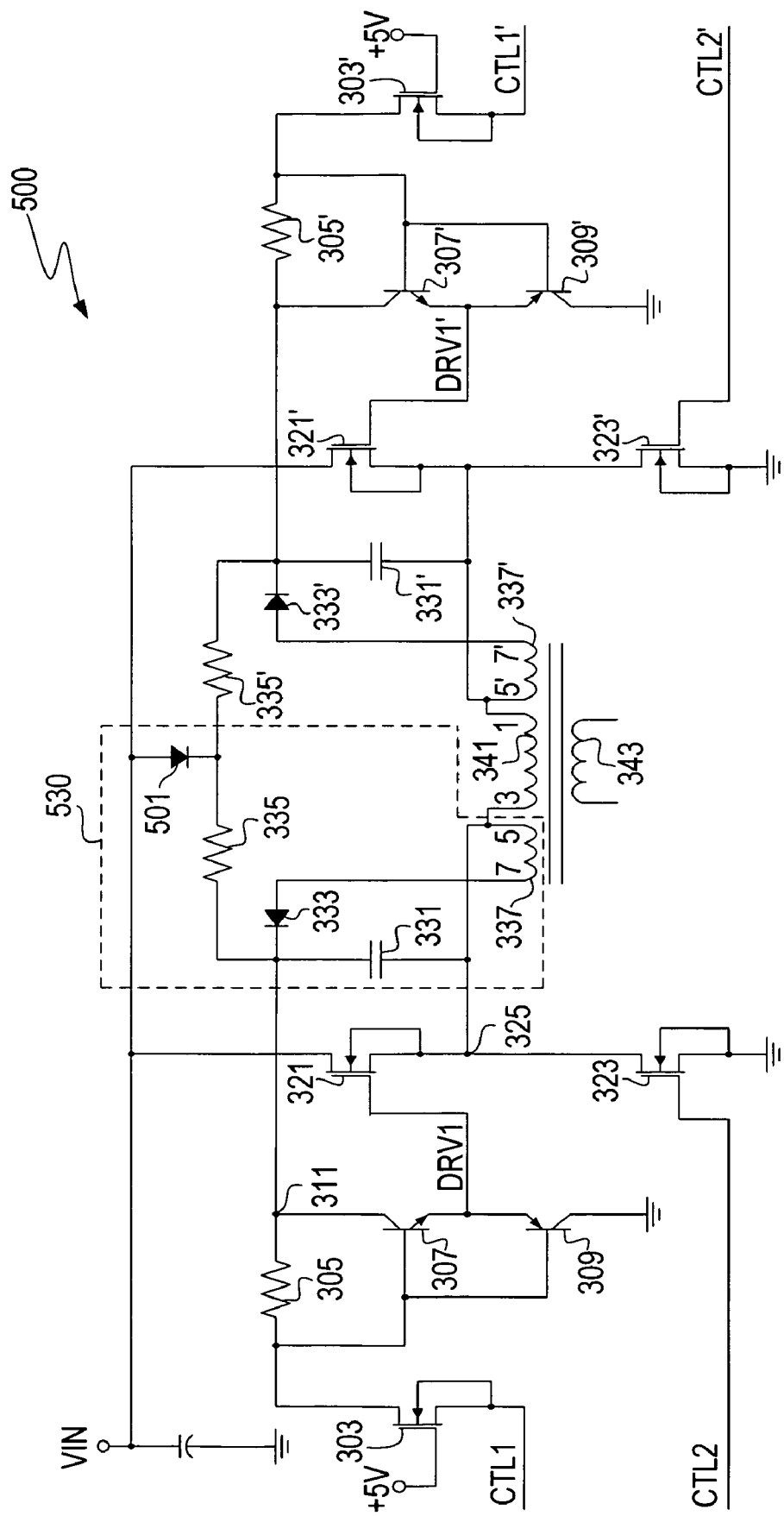
FIG. 6 is an H-bridge inverter in accordance with yet another embodiment of the present invention.

FIG. 6 is an H-bridge inverter 500 in accordance with the present invention. The inverter 500 adopts a full-bridge topology which features two symmetrical bridge legs. The two bridge legs form a full-bridge circuit for receiving the DC supply voltage. Outputs of the full-bridge circuit are passed onto a transformer circuit which includes the primary winding 341 and the secondary winding 343. One bridge leg includes the drive MOSFET 303, the resistor 305, the transistors 307 and 309, the MOSFETs 321 and 323, the capacitor 331, the diode 333, the resistor 335 and the auxiliary winding 337. The other bridge leg includes a drive MOSFET 303', a resistor 305', transistors 307' and 309', MOSFETs 321' and 323', a capacitor 331', a diode 333', a resistor 335' and an auxiliary winding 337'. The controller 301 (omitted in FIG. 5) is shared by the two bridge legs to provide control signals CTL1, CTL2, CTL1' and CTL2'. An additional diode 501 is also shared by the two bridge legs to prevent a reverse current from the two capacitors 331 and 331' when the high-side N-MOSFET 321 or 321' is turned on. The two bridge legs are respectively coupled to terminals 1 and 3 of the primary winding 341. In the inverter 500, each bridge leg adopts a newly designed auxiliary circuit, for example, an auxiliary circuit 530 in one bridge leg. In the auxiliary circuit 530, the first end of the resistor 335 is coupled to the cathode of the diode 333, the second end of the resistor 335 is coupled to the additional diode 501 and the anode of the additional diode 501 receives the DC supply voltage VIN. In this situation, the voltage VBC across the capacitor 331 is expressed as an equation $$3)\ VBC = \left(VIN + VIN \times \frac{Nal}{Np}\right) \times D$$

where Nal is defined as turns of the auxiliary winding 337, and the operating duty of the diagonal MOSFETs 321 and 323' or the diagonal MOSFETs 323 and 321' herein is equivalent to the operating duty of the primary winding 341 and the symbol D is designated to represent the operating duties. Since the other bridge leg is symmetric with this one, it has identical electrical features as previously illustrated. To be noted, turns of the auxiliary winding 337' is typically equal to Nal to ensure the voltages across the capacitors 331 and 331' are the same.

In FIG. 6, the duties of drive signals DRV1, DRV1', CTL2, and CTL2' are determined by the DC supply voltage VIN. Hence, the operating duties of the MOSFETs 321, 323, 321', 323' and the primary winding 341 vary with the DC supply voltage too. This is so called hard switching feature which is also applied to the inverters in FIGS. 3 and 5.

However, most of H-bridge inverters currently utilize controllers with zero voltage switching (ZVS) phase shift control. The duties of drive signals DRV1, DRV1', CTL2, and CTL2' are fixed. Consequently, the operating duty of the primary winding 341 is also fixed. ZVS is so called soft switching feature. Typically, the operating duty of the primary winding 341 is fixed at 50% with ZVS, and the equation 3) is rewritten as an equation $$4)\ VBC = VIN \times \frac{1}{2} + VIN \times \frac{Nal}{Np} \times D$$

Where ½ represents the operating duty of the primary winding 341 and D represents the operating duty of the diagonal MOSFETs 321 and 323' or the diagonal MOSFETs 323 and 321'.

Figure 7:
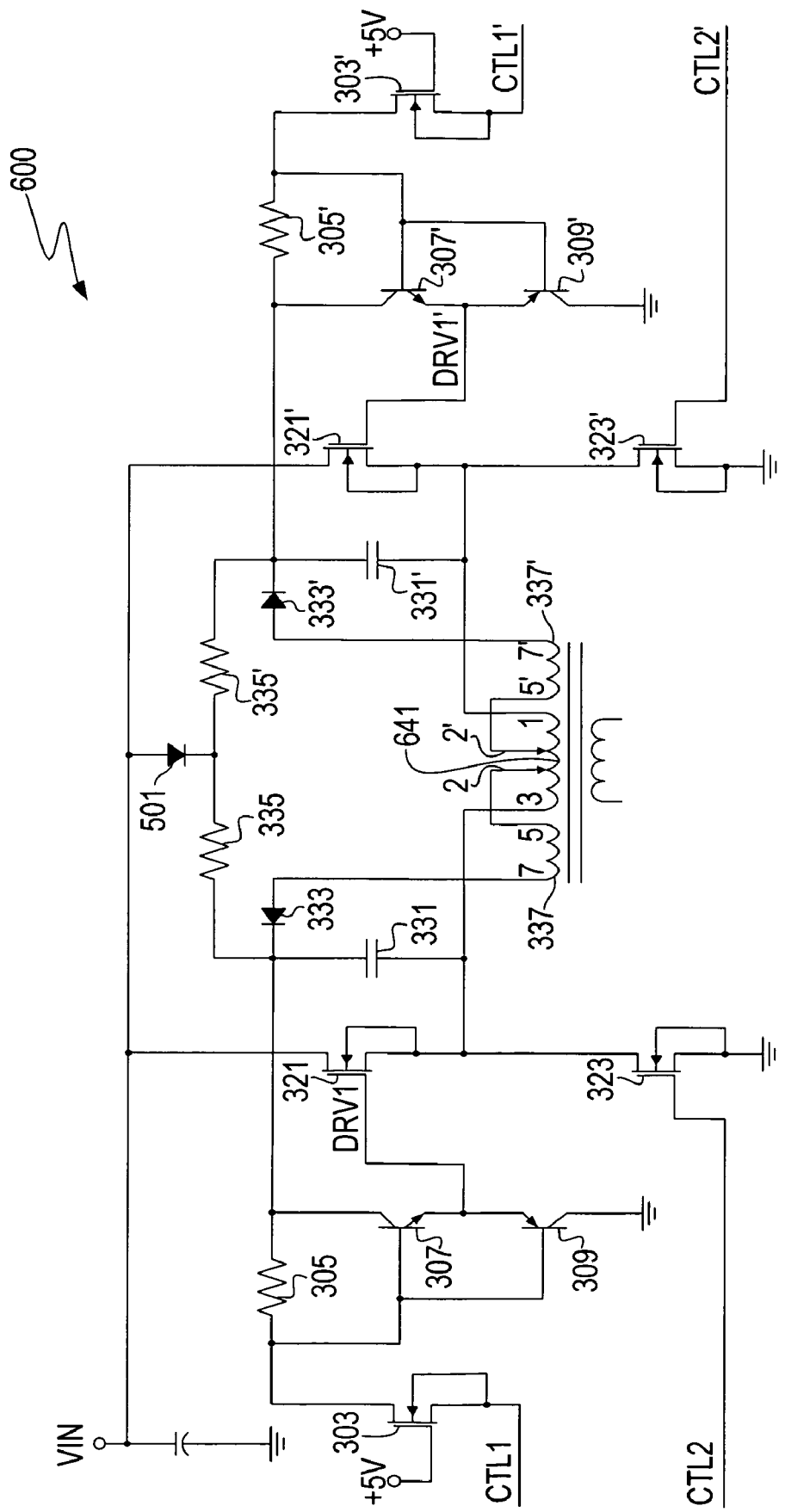
FIG. 7 is another H-bridge inverter in accordance with yet another embodiment of the present invention.

FIG. 7 is another H-bridge inverter 600 in accordance with the present invention. In the inverter 600, a primary winding 641 with two tabs 2 and 2' is used. The terminal 5 of the auxiliary winding 337 is coupled to the tab 2 and the terminal 5' of the auxiliary winding 337' is coupled to the tab 2'. The positions of the tabs 2 and 2' on the primary winding 641 are adjustable. To ensure the voltages across the capacitors 331 and 331' are equal, Nul should be equal to Nur besides the previously stated condition Nal=Nar, where Nul is defined as turns of the primary winding between the terminal 3 and the tab 2 and Nur as turns of the primary winding between the terminal 1 and the tab 2'. Now, assuming (Np−Nu)/Np=K, the voltage VBC across the capacitor 331 is calculated according to an equation $$5)\ VBC = \left(K \times VIN + VIN \times \frac{Nal}{Np}\right) \times D$$

and taking account of the soft switching feature, the voltage VBC is calculated according to an equation $$6)\ VBC = \frac{1}{2} \times K \times VIN \times + VIN \times \frac{Nal}{Np} \times D$$

where K=(Np−Nu)/Np as previously stated.

Figure 8:
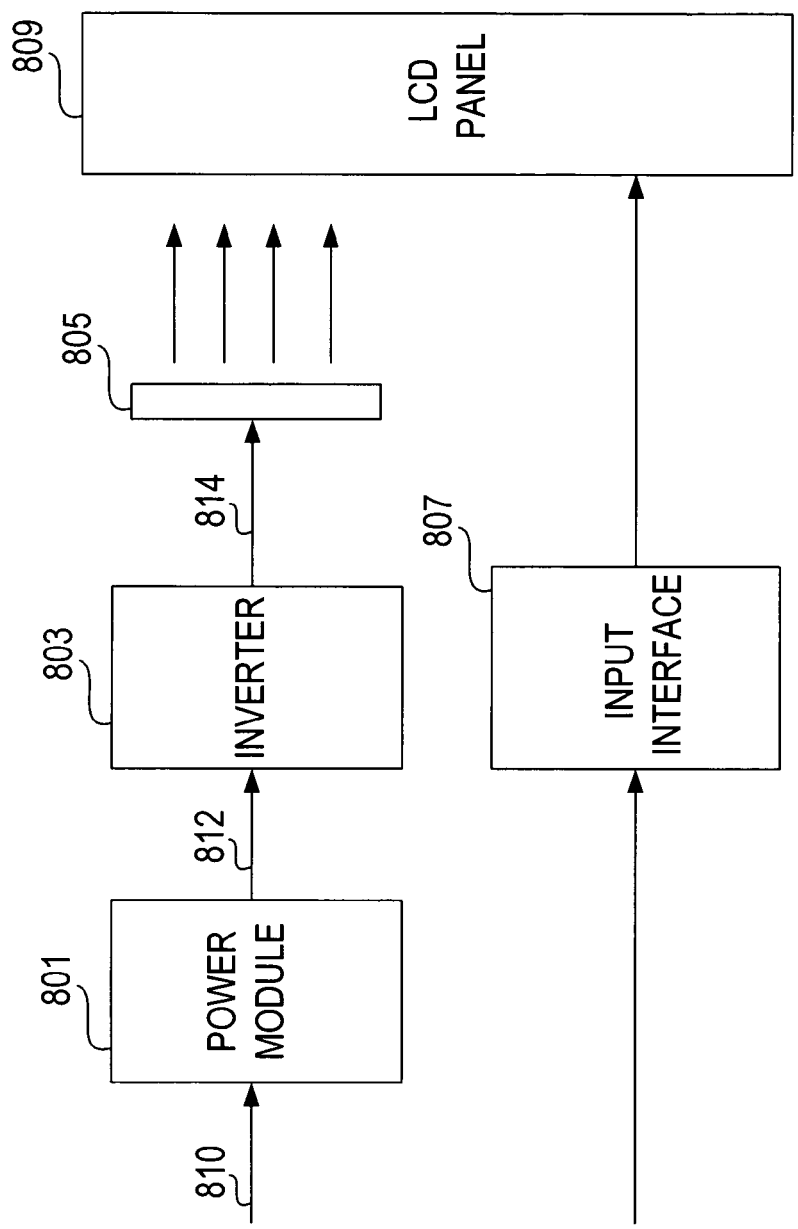
FIG. 8 is a simplified diagram of a LCD device in accordance with yet another embodiment of the present invention.

FIG. 8 illustrates a simplified diagram of a LCD device for displaying video images. The LCD device includes a power module 801, an inverter 803, a light source 805, an input interface 807 and a LCD panel 809. Besides video image information, the LCD panel 809 needs the backlight source 805 in order to produce a visible image. The backlight source 805 needs to be driven by the inverter 803. The inverter 803 converts a DC voltage on line 812 to an AC voltage on line 814 and the AC voltage is then used to drive the backlight source 805. The inverter 803 herein is configured in accordance with the present invention. Hence, a gate-source voltage of the inverter 803 is adjustable according to the inputted DC voltage as previously stated. The DC voltage is provided by a power module 801 which receives external electric power through line 810 and outputs the DC voltage. In addition, the LCD panel receives video image information from the input interface 807. The video image information is originally carried by video signals from an external device, for example a computer, and the input interface 807 receives the video signals and transforms them to signals applicable to the LCD panel 809.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An inverter for converting a DC voltage signal to an AC voltage signal, comprising:
   1) a drive circuit providing a first drive signal and a second drive signal, the drive circuit having an input terminal for receiving an operating voltage signal;
   2) a switch circuit generating a voltage signal at an output terminal, the switch circuit including a high-side transistor for receiving the first drive signal from the drive circuit ad a low-side transistor for receiving the second drive signal from the drive circuit, the high-side transistor and the low-side transistor being coupled in series between the DC voltage signal and ground, the high-side transistor having a gate-source voltage;
   3) an auxiliary circuit adjusting the gate-source voltage of the high-side transistor, the auxiliary circuit being coupled to the drive circuit for providing the operating voltage and to the output terminal of the switch circuit for receiving the voltage signal, the auxiliary circuit comprises:
- a capacitor coupled between the input terminal of the drive circuit and the output terminal of the switch circuit;
- a diode having an anode and a cathode, the cathode of the diode being connected to the input terminal of the drive circuit;
- a resistor having a first end and a second end, the first end of the resistor receiving the DC voltage signal and the second end of the resistor being coupled to the anode of the diode; and
- an auxiliary winding having a first end and a second end, the first end of the auxiliary winding being coupled to the anode of the diode, the auxiliary winding having a second number of turns; and 4) a transformer circuit coupled to the switch circuit at the output terminal and being capable of transforming the voltage signal into the AC voltage signal, wherein the transformer circuit having a primary winding, a secondary winding, and a capacitance circuit, the primary winding having a first end and a second end, the primary winding further having a first number of turns, the secondary winding outputting the AC voltage signal.

2. The inverter of claim 1, wherein the high-side transistor and the low-side transistor being N-channel metal-oxide semiconductor field effect transistors (N-MOSFETs).

3. The inverter of claim 1, wherein each of the high-side transistor and the low-side transistor having a source terminal, a gate terminal and a drain terminal, the drain terminal of the high-side transistor receiving the DC voltage signal, the gate terminal of the high-side transistor receiving the first drive signal, the gate terminal of the low-side transistor receiving the second drive signal, the source terminal of the low-side transistor being coupled to the ground, the source terminal of the high-side transistor and the drain terminal of the low-side transistor being coupled to the output terminal of the switch circuit.

4. The inverter of claim 3, wherein the gate-source voltage being a voltage difference between the gate terminal and the source terminal of the high-side transistor.

5. The inverter of claim 1, wherein the gate-source voltage of the high-side transistor being approximately equal to a voltage across the capacitor.

6. The inverter of claim 1, wherein the gate-source voltage of the high-side transistor being adjusted by changing a ratio between the second number of turns of the auxiliary winding and the first number of turns of the primary winding.

7. The inverter of claim 1, wherein the first end of the primary winding being coupled to the second end of the auxiliary winding and the second end of the primary winding being coupled to ground through the capacitance circuit.

8. The inverter of claim 1, wherein the first end of the primary winding being coupled to the output terminal of the switch circuit for receiving the voltage signal, the second end of the primary winding being coupled to ground through the capacitance circuit, the primary winding further having a tab, the tab of the primary winding being coupled to the second end of the auxiliary winding and a position of the tab on the primary winding being adjustable.

9. The inverter of claim 8, wherein the gate-source voltage of the high-side transistor being adjusted by changing the position of the tab on the primary winding.

10. The inverter of claim 1, wherein a voltage at the second end of the primary winding being a half of the DC voltage signal.

11. The inverter of claim 1, wherein the drive circuit, the switch circuit, the auxiliary circuit and the transformer circuit forming a half-bridge topology inverter.

12. An inverter for converting a DC voltage signal to an AC voltage signal, comprising:
a) a full-bridge circuit receiving the DC voltage signal, the full-bridge circuit having two bridge legs, each bridge leg further including:
  1) a drive circuit providing a first drive signal and a second drive signal, the drive circuit having an input terminal for receiving an operating voltage signal;
  2) a switch circuit generating a voltage signal at an output terminal, the switch circuit including a high-side transistor for receiving the first drive signal from the drive circuit and a low-side transistor for receiving the second drive signal from the drive circuit, the high-side transistor and the low-side transistor being coupled in series between the DC voltage signal and ground, the high-side transistor having a gate-source voltage; and
  3) an auxiliary circuit adjusting the gate-source voltage of the high-side transistor, the auxiliary circuit being coupled to the drive circuit for providing the operating voltage and to the output terminal of the switch circuit for receiving the voltage signal, the auxiliary circuit comprises:
    - a first diode having a cathode and an anode, the anode of the first diode receiving the DC voltage signal;
    - a resistor having a first end and a second end, the first end being coupled to the cathode of the first diode, the second end of the resistor being coupled to the input terminal and the drive circuit;
    - a capacitor coupled between the input terminal of the drive circuit and the output terminal of the switch circuit;
    - a second diode having an anode and a cathode, the cathode of the second diode being connected to the input terminal of the drive circuit; and
    - an auxiliary winding having a first end and a second end, the first end of the auxiliary winding being coupled to the anode of the second diode, the auxiliary winding having a second number of turns; and
b) a transformer circuit generating the AC voltage signal, the transformer circuit having a primary winding and a secondary winding, the primary winding having two ends, each end being coupled to the output terminal of one bridge leg, the primary winding further having a first number of turns, the secondary winding outputting the AC voltage signal.

13. The inverter of claim 12, wherein the high-side transistor and the low-side transistor being N-channel metal-oxide semiconductor field effect transistors (N-MOSFETs).

14. The inverter of claim 12, wherein each of the high-side transistor and the low-side transistor having a source terminal, a gate terminal and a drain terminal, the drain terminal of the high-side transistor receiving the DC voltage signal, the gate terminal of the high-side transistor receiving the first drive signal, the gate terminal of the low-side transistor receiving the second drive signal, the source terminal of the low-side transistor being coupled to the ground, the source terminal of the high-side transistor and the drain terminal of the low-side transistor being coupled to the output terminal of the switch circuit.

15. The inverter of claim 14, wherein the gate-source voltage being a voltage difference between the gate terminal and the source terminal of the high-side transistor.

16. The inverter of claim 12, wherein the second end of the auxiliary winding being coupled to one of the two ends of the primary winding.

17. The inverter of claim 12, wherein the gate-source voltage of the high-side transistor being approximately equal to a voltage across the capacitor.

18. The inverter of claim 12, wherein the gate-source voltage of the high-side transistor being adjusted by changing a ratio between the second number of turns of the auxiliary winding and the first number of turns of the primary winding.

19. The inverter of claim 12, wherein the primary winding of the transformer circuit further having two tabs, positions of the two tabs being adjustable and each of the two tabs being coupled to one of the two bridge legs at the second end of the auxiliary winding.

20. The inverter of claim 19, wherein the gate-source voltage of the high-side transistor being adjusted by changing positions of the two tabs.

21. The inverter of claim 12, wherein the full-bridge circuit and the transformer circuit forming an H-bridge topology inverter.

\* \* \* \* \*